2,999,752
ZINC FOOD SUPPLEMENT
Charles S. Webb, 256 Columbia Ave., Palmerton, Pa.
No Drawing. Filed Aug. 28, 1958, Ser. No. 757,684
5 Claims. (Cl. 99—2)

This invention relates to a method of supplying zinc oxide as an additive to animal feed and fertilizer mixes for the purpose of supplying elemental zinc in animal and plant nutrition. More particularly, this invention relates to the manufacture of a material that contains about from 87% to 92% zinc oxide combined with dolomitic lime (mixed calcium and magnesium oxides) and other elements so ground as to have a high degree of fineness.

The fact that elemental zinc plays an essential part in plant and animal metabolism has long been recognized. On a nearly zinc free diet, growth is retarded. Moreover, the formulators of animal feed mixes have recognized that the presence of elemental zinc in swine food prevents parakeratosis.

Zinc oxide is a preferred material in supplying zinc to the animal body inasmuch as zinc oxide is easily soluble in digestive juices and thus readily available to body tissues through the digestive processes. Heretofore, difficulty has been experienced in mixing zinc oxide with other minerals and animal feed. This difficulty is due to the fact that zinc oxide is a very light, flocculent, extremely fine material that agglomerates easily. These physical characteristics of zinc oxide make it difficult for the formulator of feed mixes to distribute the zinc oxide uniformly in his mix, thus necessitating the use of long periods of mixing time and specially adapted machinery in the preparation of mixes.

It is accordingly an object of this invention to provide a new zinc oxide material composed of discrete particles which mix readily with the other ingredients of animal feeds and fertilizers. Another object is to provide such a material in an economic manner. A further object is to provide an improved method of insuring quality control of the zinc oxide content of commercial animal feeds and fertilizers for compliance with governmental labelling requirements.

I have discovered that a uniformly mixed composition consisting essentially of zinc oxide and dolomitic lime in specific proportions, and preferably consisting essentially of from 87% to 92% by weight zinc oxide, when ground to a particle size in the range of 44 to 100 microns differs sharply from pure zinc oxide in its physical characteristics and in its effectiveness. The following table illustrates typical chemical and physical differences:

|  | Sample According to this Invention | Commercial Zinc Oxide |
|---|---|---|
| Color | Grey to cream. | White to cream. |
| Zinc oxide min. (percent by wieght) | 88.0 | 98.0 |
| Iron oxide (percent by wt.) | 1.8 |  |
| Calcium oxide (percent by wt.) | 6.1 |  |
| Magnesium oxide (percent by wt.) | 3.87 |  |
| Lead (percent by wt.) | 0.015 |  |
| Antimony (percent by wt.) | 0.0005 |  |
| Arsenic (percent by wt.) | 0.0006 |  |
| Copper (percent by wt.) | 0.047 |  |
| Density (relative to water=1) | 5.5 | 0.5 |
| Fineness 325 mesh (44 microns) | 1.0% Max |  |
| Fineness 150 mesh (100 microns) | 5.0% Max |  |
| Agglomerating Characteristics | None | Decided. |
| Average Particle Size (microns) | 62.0 | 0.5 |

The new composition according to this invention is conveniently manufactured from a zinc bearing ore, such as, for example zinc sulfide, zinc carbonate and the like, such ore being carefully chosen to avoid he presence of undesirable or poisonous heavy metals such as lead, bismuth, arsenic and the like. The zinciferous ore is calcined at a high temperature in an oxidizing atmosphere to eliminate chemically combined elements and to convert the ore to dead-burnt zinc oxide. This product contains an average of approximately 90% zinc oxide which is combined with dolomitic lime and other materials, thereby constituting a highly concentrated nutritional zinc additive composition.

The calcined material is suitably ground by an attrition mill or other like pulverizing apparatus to a fineness of from 44 microns to 100 microns. This reduction in size to the range indicated is a critical limitation of this invention as hereinbefore disclosed. It has been found that when the zinc oxide composition of this invention is ground to the size range of from about 44 to 100 microns, mixing times are reduced considerably and the fertilizer or feed mix is uniform. When the particle size range increases above 100 microns, the material is too granular and too large for uniform distribution with other minerals. When the particle size goes considerably below 44 microns, the material is characterized by its flocculent nature and tendency to agglomerate.

The finely ground composition is now suited for mixture with other ingredients and chemical compounds constituting the bulk of animal feeds and fertilizers. It is preferably added to these feeds and fertilizers in such amounts as to constitute by weight on a metallic zinc basis from 0.01% to 1.0% of the total weight of the mixture. The final mixture of the animal feed or fertilizer as used contains extremely small amounts of homogeneously dispersed zinc oxide. The following examples demonstrate the utility of this invention, the percentages shown being expressed as parts by weight of the composition (based on the weight of metallic zinc):

EXAMPLES I–V

*Fertilizer mix percent by wt.*

| | | | | | |
|---|---|---|---|---|---|
| Calcium Carbonate | 78.40 | 78.41 | 78.35 | 78.44 | 78.44 |
| Magnesium Carbonate | 11.80 | 11.85 | 11.79 | 11.82 | 11.77 |
| Potassium Carbonate | 0.51 | 0.50 | 0.50 | 0.50 | 0.50 |
| Iron | 0.48 | 0.49 | 0.49 | 0.47 | 0.48 |
| Manganese | 0.52 | 0.52 | 0.51 | 0.53 | 0.53 |
| Zinc | 0.02 | 0.03 | 0.06 | 0.08 | 1.0 |
| Copper | 0.0017 | 0.0015 | 0.0015 | 0.0014 | 0.0014 |
| Boron | 0.0024 | 0.0024 | 0.0022 | 0.0022 | 0.0021 |
| Molybdenum | 0.0001 | 0.0001 | 0.0002 | 0.0001 | 0.0001 |

EXAMPLES VI–X

*Livestock and poultry premix (percent by wt.)*

| | | | | | |
|---|---|---|---|---|---|
| Iron | 9.60 | 10.08 | 10.59 | 9.12 | 8.64 |
| Copper | 0.73 | 0.77 | 0.80 | 0.70 | 0.66 |
| Zinc | 0.67 | 0.70 | 0.74 | 0.64 | 0.60 |
| Manganese | 12.20 | 12.81 | 13.42 | 11.59 | 10.98 |
| Cobalt | 0.26 | 0.27 | 0.29 | 0.25 | 0.23 |
| Iodine | 0.38 | 0.40 | 0.42 | 0.36 | 0.34 |
| Sulfur | 10.80 | 11.34 | 11.88 | 10.26 | 9.72 |
| Calcium | 4.82 | 4.96 | 5.20 | 4.72 | 4.48 |

1 lb. of this premix in 1 ton of livestock feed supplies the following parts per million of the essential trace elements.

| | | | | | |
|---|---|---|---|---|---|
| Iron | 48.00 | 50.40 | 52.80 | 45.60 | 43.20 |
| Copper | 3.65 | 3.83 | 4.01 | 3.47 | 3.29 |
| Zinc | 3.35 | 3.52 | 3.69 | 3.18 | 3.01 |
| Manganese | 61.00 | 64.05 | 67.10 | 57.95 | 54.90 |
| Cobalt | 1.30 | 1.37 | 1.43 | 1.24 | 1.17 |
| Iodine | 1.90 | 2.00 | 2.09 | 1.81 | 1.71 |
| Sulfur | 54.00 | 56.70 | 59.40 | 51.30 | 48.60 |
| Calcium | 21.00 | 22.05 | 23.10 | 19.95 | 18.90 |

EXAMPLES XI–XV

*Swine salt mix (percent by wt.)*

| Iron | 0.330 | 0.347 | 0.363 | 0.314 | 0.297 |
|---|---|---|---|---|---|
| Copper | 0.048 | 0.050 | 0.053 | 0.046 | 0.043 |
| Zinc | 0.500 | 0.530 | 0.550 | 0.475 | 0.450 |
| Manganese | 0.400 | 0.420 | 0.440 | 0.380 | 0.360 |
| Cobalt | 0.022 | 0.023 | 0.024 | 0.021 | 0.020 |
| Iodine | 0.007 | 0.007 | 0.008 | 0.007 | 0.006 |
| Salt | 97.000 | 97.500 | 97.600 | 97.400 | 97.400 |

The zinc oxide composition of this invention, manufactured as disclosed, from a chosen sulfide or other zinc ore, has numerous advantages over chemically pure zinc oxide for animal feed mixtures and commercial fertilizers. First, a lower commercial cost is attained because of the relative simplicity of the manufacturing operations involved in preparing this novel composition. Also the higher density and lower bulking values of this composition lend themselves to high speed, short-time mixing operations, which are not possible with extremely fine fluffy pure zinc oxides. Moreover, by virtue of the presence in the composition of this invention of from 87–92% zinc oxide combined with dolomitic lime, it is possible economically to incorporate with nutritional zinc oxide additional desirable trace impurities which must be added to prepared commercial feeds and fertilizers. Furthermore, the composition of my invention permits improved mixing operations which assure the uniform distribution of the zinc bearing oxide throughout the prepared feeds and fertilizers for marketing purposes and for compliance with various state laws requiring that the manufacturer guarantee the contents of his package.

While the preferred embodiment of this invention has been described in some detail, it will be obvious to one skilled in the art that various modifications may be made without departing from the invention as hereinafter claimed.

Having thus described the invention, I claim:

1. An animal and vegetable nutritional supplement composition consisting essentially of a uniform mixture of from about 80–90% by weight zinc oxide and from about 10–20% by weight dolomitic lime, said composition being in the form of discrete particles having sizes in the range of from about 44 microns to about 100 microns.

2. An animal and vegetable nutritional supplement composition consisting essentially of from about 80–90% by weight zinc oxide and from about 10–20% by weight of a mixture of calcium and magnesium oxides, said composition being in the form of discrete particles having sizes in the range of from about 44 microns to about 100 microns.

3. An animal and vegetable food mixture having incorporated therein the composition of claim 1 in an amount of from 0.01–1.0% by weight of the total mixture, based on the weight of metallic zinc.

4. An animal and vegetable food mixture having incorporated therein the composition of claim 2 in an amount of from 0.01–1.0% by weight of the total mixture, based on the weight of metallic zinc.

5. An animal and vegetable nutritional supplement composition consisting essentially as follows (based on the weight of metallic zinc):

| | |
|---|---|
| Zinc oxide (percent by wt.) | 88.0 |
| Iron oxide (percent by wt.) | 1.8 |
| Calcium oxide (percent by wt.) | 6.1 |
| Magnesium oxide (percent by wt.) | 3.87 |
| Copper (percent by wt.) | 0.047 | said composition being in the form of discrete particles having sizes in the range of from about 44 microns to about 100 microns.

References Cited in the file of this patent

UNITED STATES PATENTS 2,683,658     Saunders et al. _____ July 13, 1954

OTHER REFERENCES

Merck Veterinary Manual, pages 1058–1059, 1955, Merck & Co., Rahway, New Jersey.

Seiden-Feedstuffs Handbook, 1957, Springer Publ. Co., N.Y.C., page 224.